(No Model.)
J. A. CLARK.
DRINKING TUBE.
No. 599,893. Patented Mar. 1, 1898.
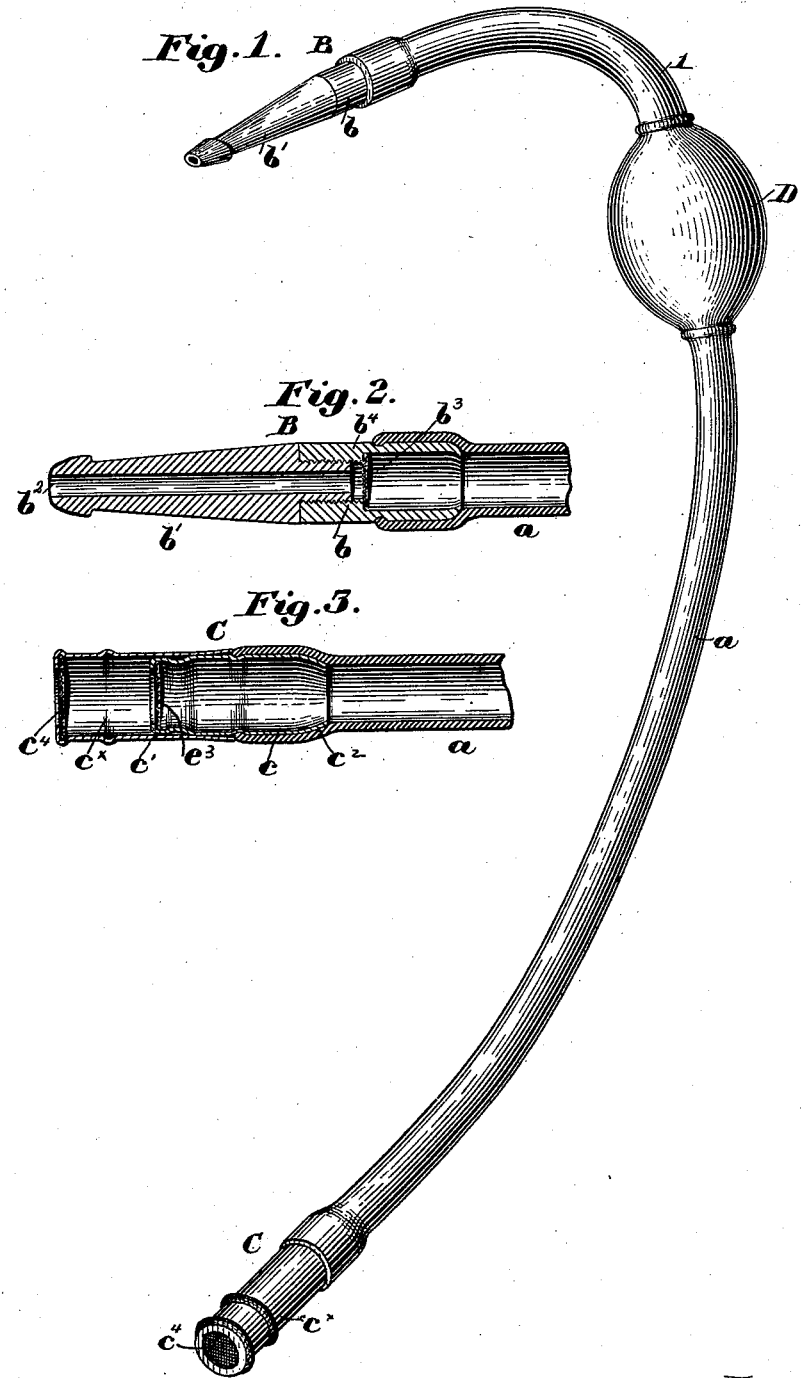
Witnesses:
Walter E. Lombard
A. C. Harmon
Inventor:
John A. Clark,
by Crosby & Gregory
Attys.

UNITED STATES PATENT OFFICE.

JOHN A. CLARK, OF WORCESTER, MASSACHUSETTS.

DRINKING-TUBE.

SPECIFICATION forming part of Letters Patent No. 599,893, dated March 1, 1898.

Application filed July 17, 1896. Serial No. 599,485. (No model.)

*To all whom it may concern:*

Be it known that I, JOHN A. CLARK, of Worcester, county of Worcester, and State of Massachusetts, have invented an Improvement in Drinking-Tubes, of which the following description, in connection with the accompanying drawings, is a specification, like letters on the drawings representing like parts.

This invention has for its object to provide a novel and improved tube which may be conveniently carried by bicyclists, pedestrians, and other travelers and by means of which the user may drink from streams and the like without stooping with his mouth to the water and without danger of drawing in insects or foreign matter which may happen to be in the water.

In the drawings illustrating my invention, Figure 1, in perspective, shows a drinking-tube provided intermediate its length with the compression-bulb, the use of which will be hereinafter described. Fig. 2 is an enlarged sectional detail of the mouthpiece end of the tube, and Fig. 3 is an enlarged sectional detail of the suction end of the tube.

In the embodiment of my invention illustrated in the drawings the tube $a$ may be of desired material, preferably flexible rubber, of suitable weight and length, and is fitted at one end with a mouthpiece B, comprising the nipple end $b$, adapted for application to or insertion in the end of the tube, and the removable mouth end $b'$, screwed into or otherwise detachably secured to the nipple $b$. The mouth end $b'$ is of course perforated, as at $b^2$, and is made removable in order that it may be thoroughly cleansed when necessary and also to permit access to the foraminous diaphragm $b^3$, with which the nipple $b$ is provided. The foraminous diaphragm $b^3$ is herein shown as inserted from the inner end of the nipple $b$ and seated against the shoulder or ledge $b^4$ and formed about the interior passage of said nipple, and, if necessary, the entire nipple may be withdrawn in order that access to the diaphragm may be had on both sides for perfect cleaning. At its opposite end the tube $a$ is fitted with a suction-fitting C, herein shown as composed of two telescoping parts $c$ and $c'$, the part $c$ being suitably formed for insertion in or to be otherwise attached to the suction end of the tube, the part $c'$ being suitably formed to telescope preferably over and fit tightly upon the end of the part $c$. The part $c$, as herein shown, has its inner end curved or drawn gradually inward, as at $c^2$, and at its outer end is provided with an inturned rim to hold the foraminous diaphragm $c^3$. The outer end of the other part $c'$ of the fitting is also provided with an inturned lip to sustain the outer foraminous diaphragm $c^4$. When in position, the outer part $c'$ is prevented from being pushed completely onto the inner part either by its end striking the end of the rubber tube, as in the instance shown in the drawings, or in other suitable manner, so as to leave a chamber $c^\times$ between the foraminous diaphragm of the two parts of the end fitting and within the outer part $c'$.

In use the rider or pedestrian will insert the suction end of the device in and below the surface of the water, and, applying the mouth end $b'$ to the lips, is enabled to easily draw through a considerable length of the tube $a$ sufficient water to supply his thirst. Most of the foreign matter which may be contained in the water is excluded by the outer suction-diaphragm $c^4$; but should any perchance pass through said diaphragm it will in most instances be held back by the inner diaphragm $c^3$ and permit it to remain in the outer part $c'$ of the suction-fitting, from which it may be easily removed by withdrawing said part $c'$, after which the latter may be thoroughly cleansed and again telescoped or pushed upon the inner part $c$. The diaphragm $b^3$ in the mouthpiece effectually prevents any possible passage of foreign matter to the mouth of the one drinking.

My invention also comprehends the introduction between the entrance of the tube of the compressible bulb D, which may be in open communication at both ends with the lengths of the tube between which it is inserted. By compressing the tube above the bulb—for instance, at the point 1—between two of the fingers and after compressing the bulb and permitting it to again expand a quantity of water represented by the capacity of the bulb and the length of the tube between it and the suction end C is drawn into the device, and then by relieving the pressure above the bulb compression of the latter will force the water contained within it and above the point at which the tube below the bulb is compressed upwardly into the mouth of the drinker.

My improved device, as herein set forth, while easily portable, effectually guards against passage of foreign matter with the water to the mouth of the one using it, and while a filtering material may be placed between the two suction-diaphragms $c^3$ $c^4$ yet I prefer to use the device without any such material, which would soon assume a condition which would render the use of the device undesirable.

The readiness with which the several diaphragms and the entire device may be cleansed is an important feature of my invention, which is not necessarily limited in all respects to the particular embodiment herein shown.

What I claim is—

1. A drinking device, comprising a flexible tube, a two-part mouthpiece applied at one end of the tube, said mouthpiece comprising a nipple interiorly threaded, and a mouth end screwing removably into said threaded nipple, the latter also having an annular shoulder $b^4$ adjacent the inner end of said mouth end and facing inwardly, and a foraminous diaphragm $b^3$ removably mounted against said shoulder, and a suction-fitting applied at the opposite end of the tube, said fitting being composed of the two telescoping parts $c$ $c'$, and one or more separable foraminous diaphragms arranged in the said suction-fitting, substantially as described.

2. In a drinking device, the combination with the flexible tube and the mouthpiece supplied at one end thereof, of the two-part suction-fitting applied at the opposite end of the tube, the two parts of said suction-fitting removably telescoping one within the other and being provided respectively with a foraminous diaphragm, said diaphragms, when said parts are telescoped into operative position, being separated to leave an empty chamber between the two diaphragms for the purpose specified.

3. The combination with the flexible tube, of a mouthpiece supplied at one end thereof with a two-part suction-fitting applied at the opposite end thereof, one part of said fitting telescoping the other, and foraminous diaphragms on the respective parts of said fitting, to operate, substantially as described.

4. In a drinking device, the combination with a flexible tube and a flexible bulb introduced intermediate the ends thereof, of a mouthpiece applied at one end of said tube, and a removable suction-fitting on the opposite end thereof, said fitting comprising two telescoping parts $c$, $c'$, and one or more foraminous diaphragms arranged in said suction-fitting, substantially as described.

In testimony whereof I have signed my name to this specification in the presence of two subscribing witnesses.

JOHN A. CLARK.

Witnesses:
 JOHN A. HYNES,
 DAVID B. SYME.